United States Patent
Hama

(10) Patent No.: US 10,523,719 B2
(45) Date of Patent: Dec. 31, 2019

(54) IMAGE PROCESSING APPARATUS, INFORMATION PROCESSING METHOD, AND STORAGE MEDIUM

(71) Applicant: CANON KABUSHIKI KAISHA, Tokyo (JP)

(72) Inventor: Mikio Hama, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 114 days.

(21) Appl. No.: 15/665,857

(22) Filed: Aug. 1, 2017

(65) Prior Publication Data

US 2017/0331863 A1 Nov. 16, 2017

Related U.S. Application Data

(63) Continuation of application No. 14/222,450, filed on Mar. 21, 2014, now Pat. No. 9,769,218.

(30) Foreign Application Priority Data

Mar. 27, 2013 (JP) ................................. 2013-067075

(51) Int. Cl.
| | |
|---|---|
| *H04L 29/06* | (2006.01) |
| *H04L 12/14* | (2006.01) |
| *H04N 1/00* | (2006.01) |
| *H04M 15/00* | (2006.01) |
| *H04N 1/327* | (2006.01) |
| *H04N 1/333* | (2006.01) |

(52) U.S. Cl.
CPC .......... *H04L 65/1069* (2013.01); *H04L 12/14* (2013.01); *H04L 65/1006* (2013.01); *H04L 65/1033* (2013.01); *H04M 15/60* (2013.01); *H04M 15/61* (2013.01); *H04M 15/63* (2013.01); *H04N 1/00209* (2013.01); *H04N 1/00217* (2013.01); *H04N 1/32789* (2013.01); *H04N 1/33361* (2013.01)

(58) Field of Classification Search
None
See application file for complete search history.

(56) References Cited

U.S. PATENT DOCUMENTS

| | | | |
|---|---|---|---|
| 2010/0135279 A1* | 6/2010 | Petersson | H04L 67/16 370/352 |
| 2010/0278172 A1* | 11/2010 | Watanabe | H04L 65/1053 370/352 |
| 2013/0021998 A1* | 1/2013 | Shatsky | H04W 28/26 370/329 |

* cited by examiner

*Primary Examiner* — Huy D Vu
*Assistant Examiner* — Bao G Nguyen
(74) *Attorney, Agent, or Firm* — Canon U.S.A. Inc., IP Division

(57) ABSTRACT

An image processing apparatus includes a reception unit configured to receive a session start message, a determination unit configured to determine whether the session start message received by the reception unit is a session start message from a public Internet Protocol network or a session start message from a local Internet Protocol network, an acquisition unit configured to acquire a media type included in the session start message received by the reception unit, and a control unit configured to determine whether a start of a session is allowed, based on a result determined by the determination unit and the media type acquired by the acquisition unit.

18 Claims, 8 Drawing Sheets

FIG. 3

INVITE MESSAGE STRUCTURE AND SDP DESCRIPTION

2001 — INVITE sip:user@sample.net SIP/2.0

2002 —
Via: SIP/2.0/UDP sample.net:5060
Max-Forwards:70
From: Alice <sip:alice@sample.net>
To: Bob <sip:bob@sample.net>
Call-ID: 111111@sample.net
Cseq: 1 INVITE
Contact: <sip:Alice@192.168.1.2>
Content-Type: application/sdp
Content-Length: 138

2003 —

2004 —
v=0
o=Alice 901628708 901628708 IN IP4 sample.net
s=-
t=0 0
m=audio 5004 RTP/AVP 0
a=rtpmap:0 PCMU/8000

2005
v=0
o=- 1681503649 1681503649 IN IP4 sample.net
s=-
t=0 0
m=image 9 TCP t38

IMAGE PROCESSING APPARATUS, INFORMATION PROCESSING METHOD, AND STORAGE MEDIUM

CROSS-REFERENCE TO RELATED APPLICATIONS

This application is a continuation, and claims the benefit, of U.S. patent application Ser. No. 14/222,450, presently pending and filed on Mar. 21, 2014, and claims the benefit of, and priority to, Japanese Patent Application No. 2013-067075 filed Mar. 27, 2013, which applications are hereby incorporated by reference herein in their entireties.

BACKGROUND OF THE INVENTION

Field of the Invention

The present invention relates to an image processing apparatus, an information processing method, and a storage medium.

Description of the Related Art

Recently, attention has been paid to an Internet Protocol facsimile (IPFAX) that transmits and receives a facsimile (FAX) via an Internet Protocol (IP) network.

The Session Initiation Protocol (SIP) is used for a call connection between IPFAX devices, and the T.38 protocol for data communication. An IPFAX using the T.38 protocol, which can perform communication faster than a conventional analog FAX, can transmit and receive an image in a shorter time.

The IPFAX performs FAX communication between devices connected to an intranet (local IP network) or FAX communication between devices connected to a public IP network.

Communication within an intranet, which uses a company network or a local network for communication, does not involve communication fees.

On the other hand, communication on a public IP network, like communication on an existing analog public network, employs a pay-per system that involves a fee for each FAX communication.

Conventional IPFAX devices cannot be connected to the two types of IP network, i.e., local and public IP networks, at the same time. Therefore, conventional IPFAX can operate in any one of the two modes (local IP network mode and public IP network mode) selected according to a setting made by a user, or can operate only in one of the two modes.

In recent years, as a network has become diversified, there has been a need for an IPFAX device that can communicate with any of a device on a local IP network and a device on a public IP network without requiring a user to change the user setting.

According to the SIP protocol for call connections, an INVITE message is used to request a connection. An INVITE message includes a description described in Session Description Protocol (SDP) (See Japanese Patent Application Laid-Open No. 2012-90213).

The SDP is a protocol used to describe a multimedia session. For example, the SDP is used to describe information about the type of media to be communicated, that is, whether an audio is to be communicated (audio), whether an image is to be communicated (image, application), and whether a video is to be communicated (video). The media type (m) is used to determine what is to be communicated.

Normally, "m=audio" is specified for IP telephony, and "m=image" or "m=application" is specified for IPFAX via a public IP network.

Because T.38 IPFAX usually does not provide the phone function, it is desirable to reject an INVITE message received from a phone. In particular, on a public IP network, a caller is charged for a call in spite of the fact that communication cannot be performed. To address this problem, in a conventional method, the media type "m=audio" is rejected but the media type "m=image" or "m=application" is accepted.

However, when IPFAX communication is performed via a local IP network, a message is transmitted usually via an SIP server that has a routing function and a registration function. This sometimes requires the user to follow a specific procedure depending on the type of the SIP server.

For example, the SIP server provided by a company requires a procedure in which "audio" is specified for the SDP media type of a first INVITE message, and after that, the media type is changed to "image". Therefore, if all INVITE messages are simply rejected because the media type is "audio", there is an issue that IPFAX communication cannot be performed via a local IP network.

There is a T.38 gateway (T.38 GW) capable of connecting an analog FAX to an IP network as an IPFAX. However, the T.38 GW provided by a company transmits an INVITE message in which "audio" is specified for the media type as described above. Normally, the T.38 GW is connected to a local IP network.

SUMMARY OF THE INVENTION

The present invention is directed to an image processing apparatus allowing connection from both a device on a local IP network and a device on a public IP network, and preventing unnecessary charging.

An image processing apparatus includes a reception unit configured to receive a session start message, a determination unit configured to determine whether the session start message received by the reception unit is a session start message from a public Internet Protocol network or a session start message from a local Internet Protocol network, an acquisition unit configured to acquire a media type included in the session start message received by the reception unit, and a control unit configured to determine whether a start of a session is allowed, based on a result determined by the determination unit and the media type acquired by the acquisition unit.

Further features of the present invention will become apparent from the following description of exemplary embodiments with reference to the attached drawings.

BRIEF DESCRIPTION OF THE DRAWINGS

FIG. 3 is a diagram illustrating an example of a structure of an INVITE message and an SDP description.

DESCRIPTION OF THE EMBODIMENTS

Various exemplary embodiments, features, and aspects of the invention will be described in detail below with reference to the drawings.

Figure 1:
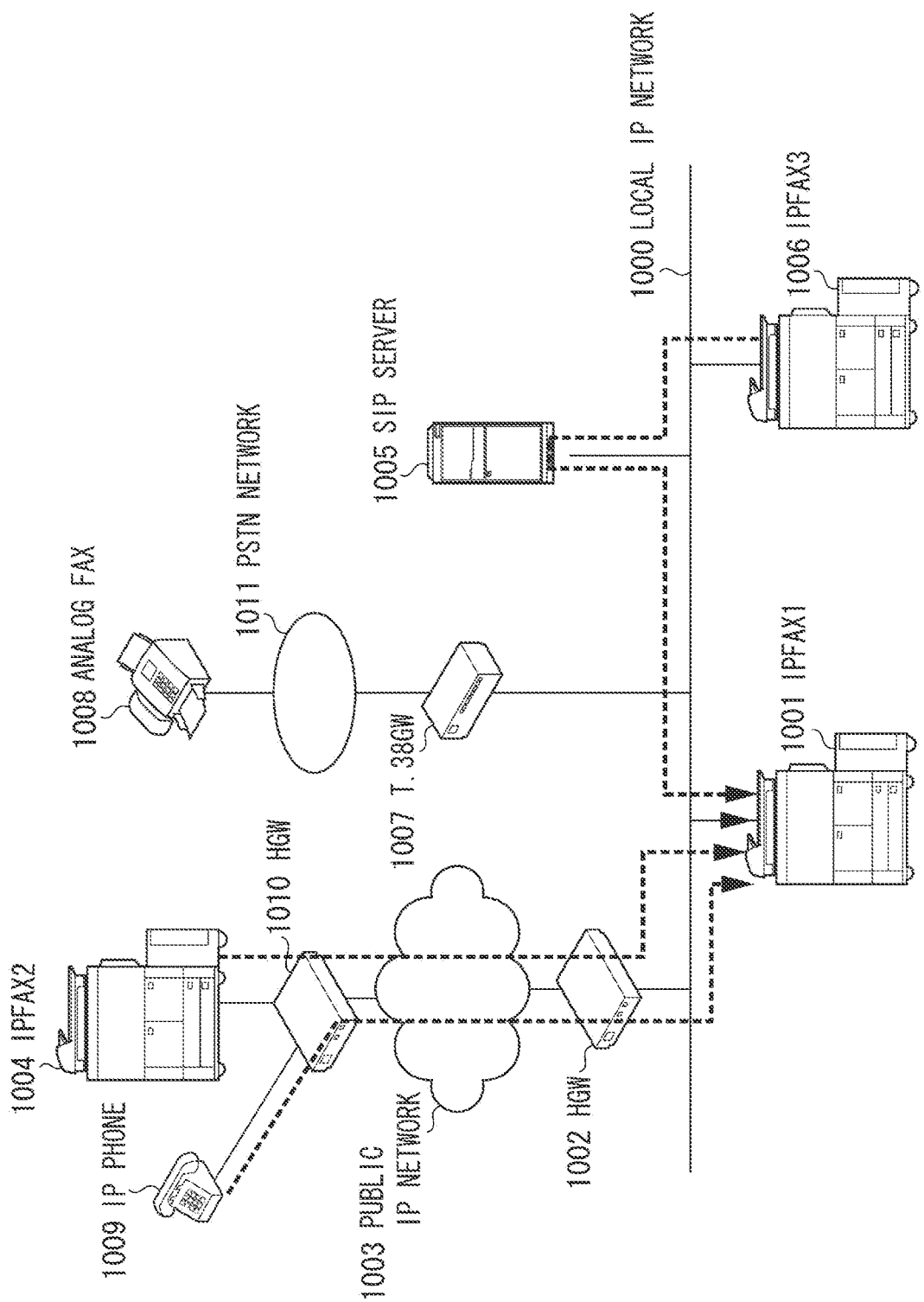
FIG. 1 is a diagram illustrating an example of a system configuration of a FAX system that includes IPFAX devices.

FIG. 1 is a diagram illustrating an example of a system configuration of a FAX system that includes IPFAX devices. For the sake of simplicity, an IPFAX device is simply described as an IPFAX, and a FAX device is simply described as a FAX. An IPFAX is an example of an image processing apparatus.

The FAX system includes a local IP network 1000 and a public IP network 1003.

Home gateways (HGW) 1002 and 1010 are gateways for connecting to the public IP network 1003.

An IPFAX 1 (1001) is an IPFAX connected to the local IP network 1000. The IPFAX 1 (1001) can communicate also with the public IP network 1003 via the HGW 1002.

An IPFAX 2 (1004) is an IPFAX connected to the public IP network 1003. An IP phone 1009 and the IPFAX2 (1004) are connected to the public IP network 1003 via the HGW 1010. An SIP server 1005 is connected to the local IP network 1000. An IPFAX 3 (1006) is an IPFAX connected to the local IP network 1000. The IPFAX 3 (1006) can communicate with the IPFAX 1 (1001) via the SIP server 1005.

A T.38 gateway (T.38 GW) 1007 is a gateway (GW) connected to a public switched telephone network (PSTN) network 1011 and the local IP network 1000. An analog FAX 1008 is an analog FAX connected to the PSTN network 1011. The T.38 GW 1007 converts an SIP call connection to an analog phone call connection, and the T.38 protocol to the T.30 protocol, in real time to enable intercommunication between an IPFAX and an analog FAX.

An IPFAX has an IPFAX function of sending and receiving a FAX via an IP network.

Figure 2:
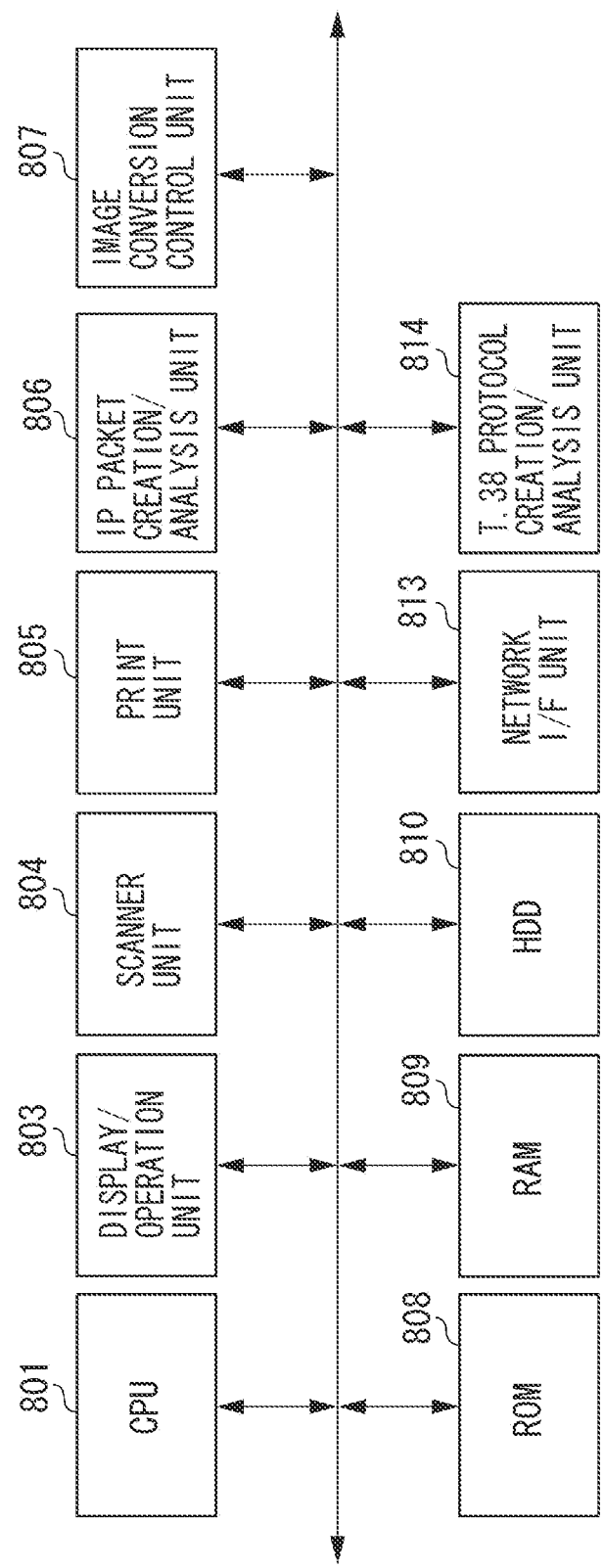
FIG. 2 is a diagram illustrating an example of a hardware configuration of an IPFAX 1.

FIG. 2 is a diagram illustrating an example of a hardware configuration of the IPFAX 1.

A central processing unit (CPU) 801 controls the devices in the IPFAX 1 (1001) and executes the processing of the flowchart, which will be described below, based on a control program stored in a read only memory (ROM) 808.

A display/operation unit 803 displays a screen related to settings described below, and receives information entered via an operation.

A scanner unit 804 reads a document.

A print unit 805 prints print data saved in a random access memory (RAM) 809 or a hard disk drive (HDD) 810.

The ROM 808 stores various control programs and data. The RAM 809 includes a work area for the CPU 801, a save area in which data is saved during error processing, and a load area in which a control program is loaded.

The HDD 810 saves therein various control programs and print data such as set IP addresses, which will be described below.

A network interface (I/F) unit 813 is connected to the public IP network 1003 via the local IP network 1000 and the HGW 1002.

A T.38 protocol creation/analysis unit 814 has the function of generating facsimile transmission information based on the International Telecommunication Union Telecommunication Standardization Sector (ITU-T) Recommendation T.38 protocol, and the function of extracting facsimile transmission information from a received protocol.

An IP packet creation/analysis unit 806 maps the ITU-T Recommendation T.38 protocol to an IP packet, and has the function of extracting the ITU-T Recommendation T.38 protocol from a received IP packet.

An image conversion control unit 807 performs compression/decompression, zooming, and linear density conversion of an image to be transmitted and received using FAX communication. The CPU 801 executes processing based on the programs stored in the ROM 808 or the HDD 810 to implement a software function of the IPFAX 1 and the processing according to a flowchart described below.

The T.38 protocol creation/analysis unit 814 and the IP packet creation/analysis unit 806 may be installed on the IPFAX 1 as software. This software is implemented when the CPU 801 executes the processing based on the programs.

FIG. 3 is a diagram illustrating an example of a structure of an INVITE message and an SDP description.

The INVITE message includes an SIP start line 2001, an SIP header field 2002, a blank line 2003, and an SIP message body 2004 described in the SDP. The SDP description may sometimes be the one such as an SIP message body 2005. Because the details of each field and each line is described in recommendation reports such as the Request for Comments (RFC) 4566, their description is omitted here. The following describes only the media type described in the SDP description. Information about the type of media to be communicated is described in a line beginning with "m=" in the SIP message body 2004 or 2005. For example, the SDP description "m=audio" in the SIP message body 2004 indicates that the media type is an audio (voice). Similarly, the SIP message body 2005 includes the SDP description "m=image" indicating that the media type is an image.

The INVITE message is an example of a session start message.

Figure 4:
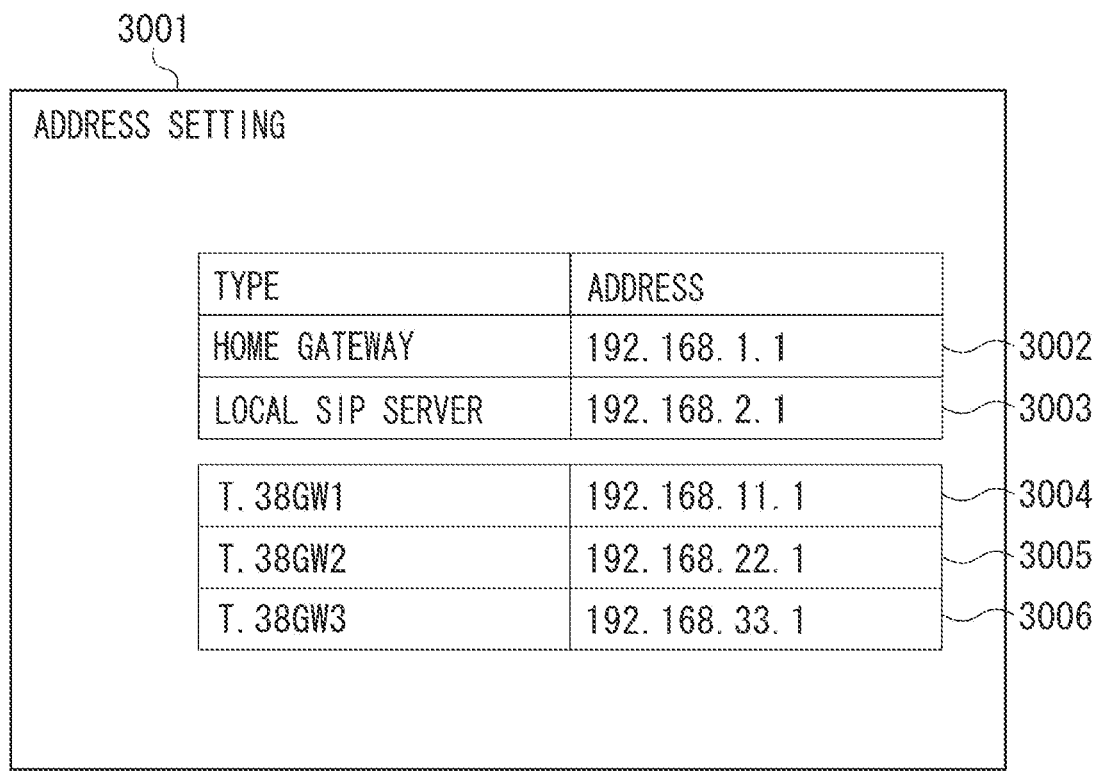
FIG. 4 is a diagram illustrating an example of an address setting screen of a gateway and an SIP server used by the IPFAX 1.

FIG. 4 is a diagram illustrating an example of an IP address setting screen of a gateway and an SIP server used by the IPFAX 1 (1001). A setting screen 3001 includes an HGW IP address registration field 3002, a local SIP server IP address registration field 3003, and T.38 GW IP address registration fields 3004, 3005, and 3006. The HGW IP address registration field 3002 contains the IP address of an HGW that is a gateway used to connect an IPFAX to a public IP network. The local SIP server IP address registration field 3003 contains the IP address of a local SIP server used to connect an IPFAX to a local IP network. Each of the T.38 GW IP address registration fields 3004, 3005, and 3006 contains the IP address of a T.38 GW used to perform communication between an IPFAX and an analog FAX. In this example, up to three T.38 GWs may be registered. However, the number of T.38 GWs used in this example does not limit the present exemplary embodiment.

As illustrated in FIG. 4, the IP address of an SIP server on a local IP network, the IP address of an HGW used to connect to a public IP network, and the IP address of a T.38 GW may be registered in an IPFAX.

A home gateway, a local SIP server, and a T.38GW are examples of devices.

Figure 5:
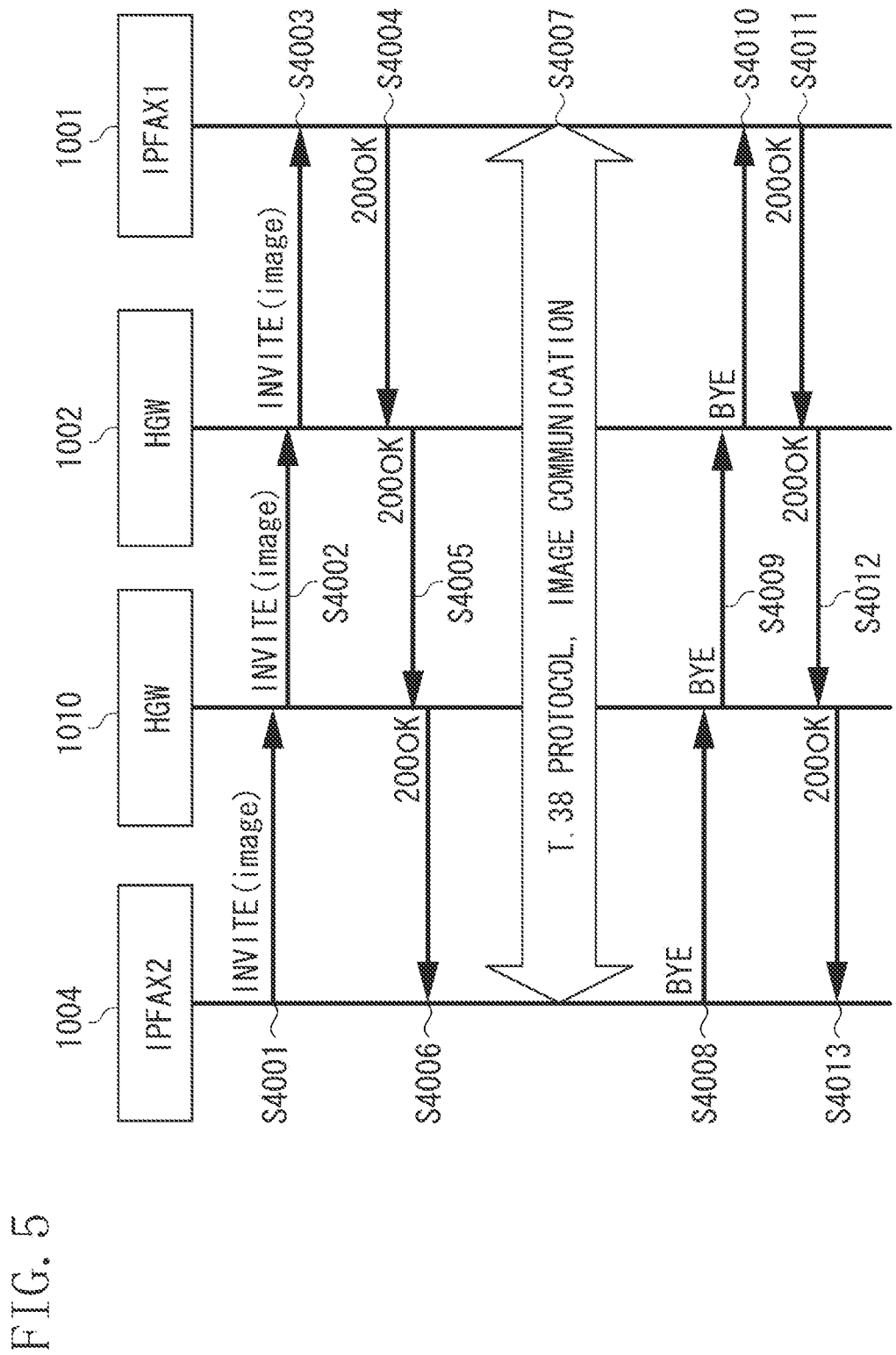
FIG. 5 is a diagram illustrating an example of a communication sequence when an image is transmitted from an IPFAX 2 to the IPFAX 1.

FIG. 5 is a diagram illustrating an example of a communication sequence when an image is transmitted from the IPFAX 2 (1004) to the IPFAX 1 (1001). In practice, a signal is transmitted between the HGW 1010 and the HGW 1002 via various servers and gateways on the public IP network 1003. The description of those servers and gateways is omitted here for simplicity.

In step S4001, the IPFAX 2 (1004) transmits an INVITE message to the HGW 1010 to make a session connection (session start) request.

In step S4002, the HGW 1010 transmits the INVITE message to the HGW 1002.

In step S4003, the HGW 1002 transmits the INVITE message to the IPFAX 1 (1001). Because the INVITE message in steps S4001, S4002, and S4003 is transmitted using an IPFAX communication over the public IP network, the media type is "image" or "application".

As will be described below in FIG. 8, the IPFAX 1 (1001) analyzes the IP packet of the INVITE message transmitted from the HGW 1002, acquires the IP address, and compares the acquired IP address with the IP addresses registered via the screen illustrated in FIG. 4. Because the IP address of the home gateway set in the field 3002 matches the IP address included in the INVITE message, the IPFAX 1 (1001) determines that the INVITE message received in step S4003 is transmitted from the HGW 1002. Therefore, the IPFAX 1 (1001) determines that the transmission source of this INVITE message is a device connected to the public IP network.

In step S4004, the IPFAX 1 (1001) transmits to the HGW 1002 a success message (200 OK) including a status code of 200 indicating that the incoming call is acceptable.

In step S4005, the HGW 1002 transmits "200 OK" to the HGW 1010.

In step S4006, the HGW 1010 transmits "200 OK" to the IPFAX 2 (1004).

After that, in step S4007, an IPFAX image is transmitted from the IPFAX 2 (1004) to the IPFAX 1 (1001) via the HGWs 1010 and 1002 using image communication based on the T.38 protocol.

The session is then disconnected by disconnection processing in steps S4008, S4009, S4010, S4011, S4012, and S4013.

Figure 6:
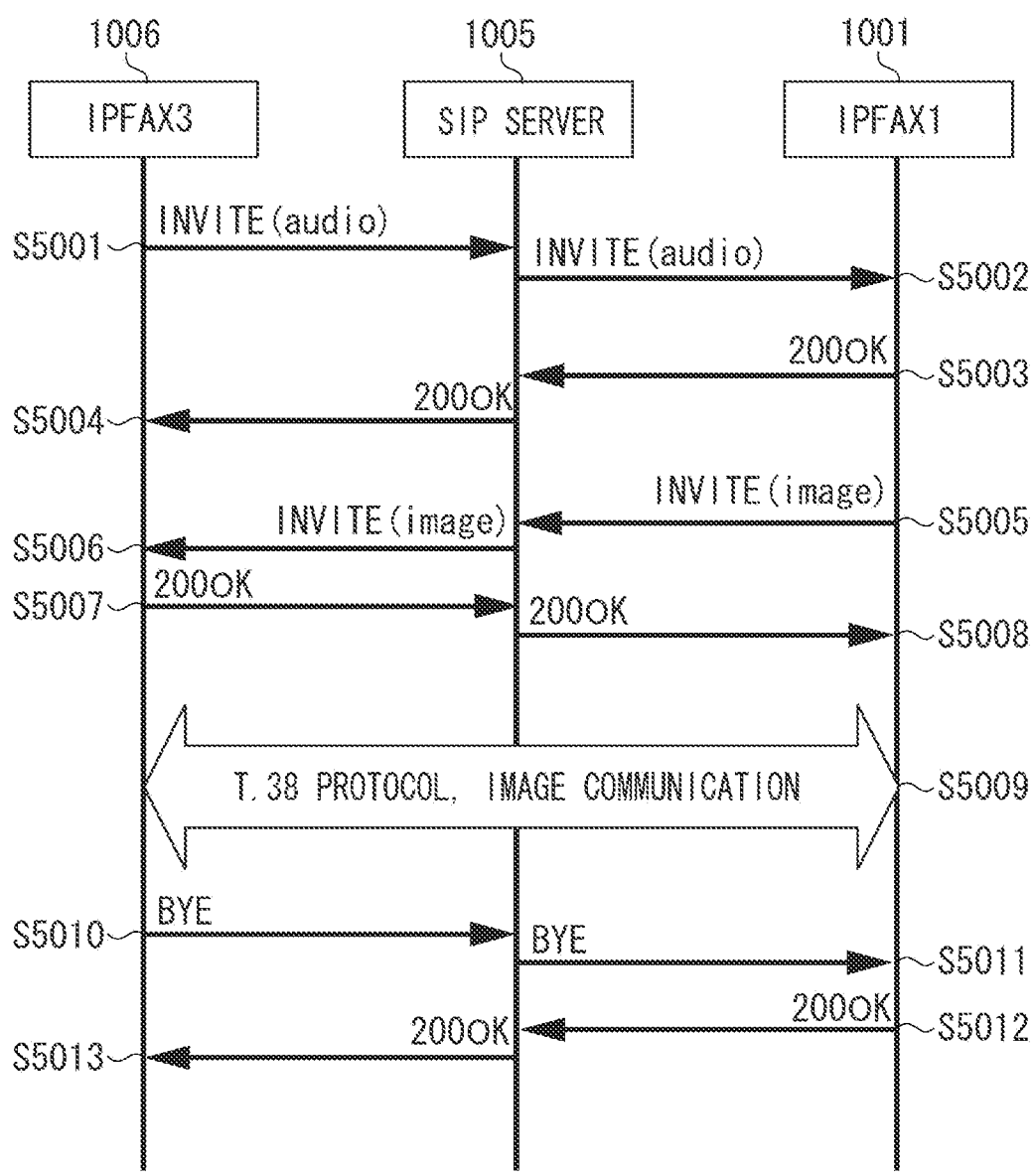
FIG. 6 is a diagram illustrating an example of a communication sequence when an image is transmitted from an IPFAX 3 to the IPFAX 1.

FIG. 6 is a diagram illustrating an example of a communication sequence when an image is transmitted from the IPFAX 3 (1006) to the IPFAX 1 (1001). On the SIP server 1005, the procedure is assumed to be necessary in which a session is once established by specifying "audio" for the media type, and after that, reconnected by specifying "image" for the media type.

In step S5001, the IPFAX 3 (1006) transmits an INVITE message to the SIP server 1005 to make a session connection request.

In step S5002, the SIP server 1005 transmits the INVITE message to the IPFAX 1 (1001). In the INVITE message in steps S5001 and S5002, "audio" is specified for the media type.

The IPFAX 1 (1001) analyzes the IP packet of the INVITE message transmitted from the SIP server 1005, acquires the IP address, and compares the acquired IP address with the IP addresses registered via the screen illustrated in FIG. 4. The IP address of the local SIP server set in the field 3003 matches the IP address included in the INVITE message. Therefore, the IPFAX 1 (1001) determines that the INVITE message received in step S5002 is transmitted from the local SIP server 1005. As a result, the IPFAX 1 (1001) determines that the transmission source of this INVITE message is a device connected to the local IP network.

In step S5003, the IPFAX 1 (1001) transmits, to the SIP server 1005, "200 OK" indicating that the incoming call is acceptable.

In step S5004, the SIP server 1005 transmits "200 OK" to the IPFAX 3 (1006).

After that, in step S5005, IPFAX 1 (1001) transmits to the SIP server 1005 an INVITE message in which the media type "image" is specified, according to the specific procedure described above.

In step S5006, the SIP server 1005 transmits to the IPFAX 3 (1006) the INVITE message in which the media type "image" is specified.

In steps S5007 and S5008, "200 OK" is transmitted from the IPFAX 3 (1006) to the IPFAX 1 (1001), and a session is established with the media type "image". In step S5009, an IPFAX image is transmitted from the IPFAX 3 (1006) to the IPFAX 1 (1001) via the SIP server 1005 using an image communication based on the T.38 protocol.

The session is then disconnected by disconnection processing in steps S5010, S5011, S5012, and S5013.

Figure 7:
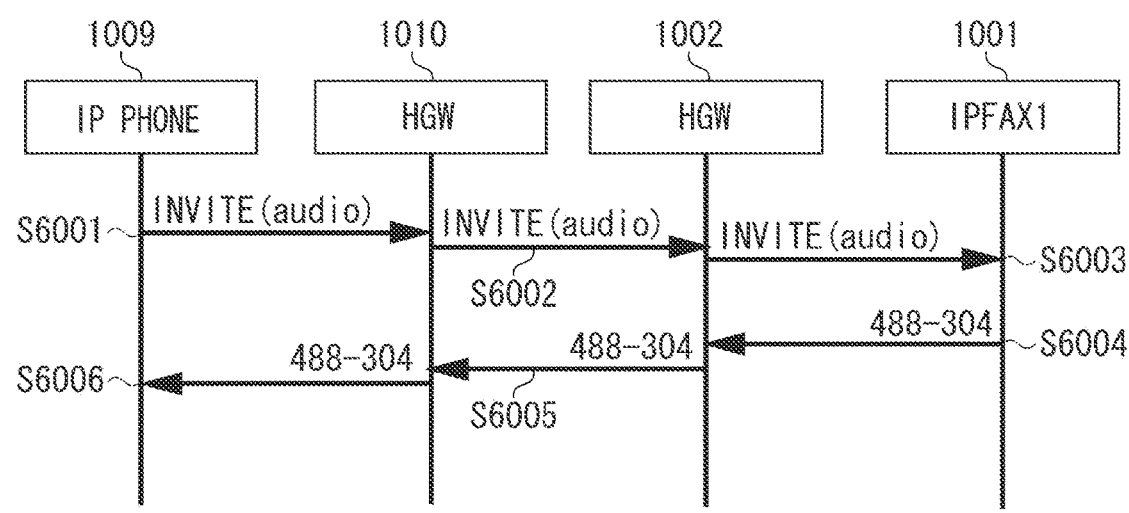
FIG. 7 is a diagram illustrating an example of a communication sequence when a call is transmitted from an IP phone to the IPFAX 1.

FIG. 7 is a diagram illustrating an example of a communication sequence when a call is transmitted from the IP phone 1009 to the IPFAX 1 (1001).

In practice, a signal is transmitted between the HGW 1010 and the HGW 1002 via various servers and gateways on the public IP network 1003. The description of those servers and gateways is omitted here for simplicity.

In step S6001, the IP phone 1009 transmits an INVITE message to the HGW 1010 to make a session connection request.

In step S6002, the HGW 1010 transmits the INVITE message to the HGW 1002.

In step S6003, the HGW 1002 transmits the INVITE message to the IPFAX 1 (1001).

Because the INVITE message in steps S6001, S6002, and S6003 is a call from the IP phone, the media type is "audio".

If the IPFAX 1 (1001) receives the call at this point, the usage fee of the public IP network is charged in spite of the fact that the call with the IP phone cannot be made.

The IPFAX 1 (1001) in the present exemplary embodiment analyzes the IP packet of the INVITE message transmitted from the HGW 1002, acquires the IP address, and compares the acquired IP address with the IP addresses registered via the screen illustrated in FIG. 4. Because the IP address of the home gateway set in the field 3002 matches the IP address included in the INVITE message, the IPFAX 1 (1001) determines that the INVITE message received in step S6003 is transmitted from the HGW 1002. Therefore, the IPFAX 1 (1001) determines that the transmission source of this INVITE message is a device connected to the public IP network.

If the device connected to the public IP network is an IPFAX, an INVITE message in which "image" or "application" is specified for the media type should be transmitted. Therefore, the IPFAX 1 (1001) determines that the device on the public IP network, which has transmitted the INVITE message in which the media type "audio" is specified, is not an IPFAX.

Therefore, in step S6004, the IPFAX 1 (1001) transmits to the HGW 1002 a media mismatch error (status code 488, warning code 304) (a response 488-304) indicating the rejection of the incoming call.

In step S6005, the HGW 1002 transmits the response 488-304 to the HGW 1010.

In step S6006, the HGW 1010 transmits the response 488-304 to the IP phone 1009. In this communication, a session is not established.

Figure 8:
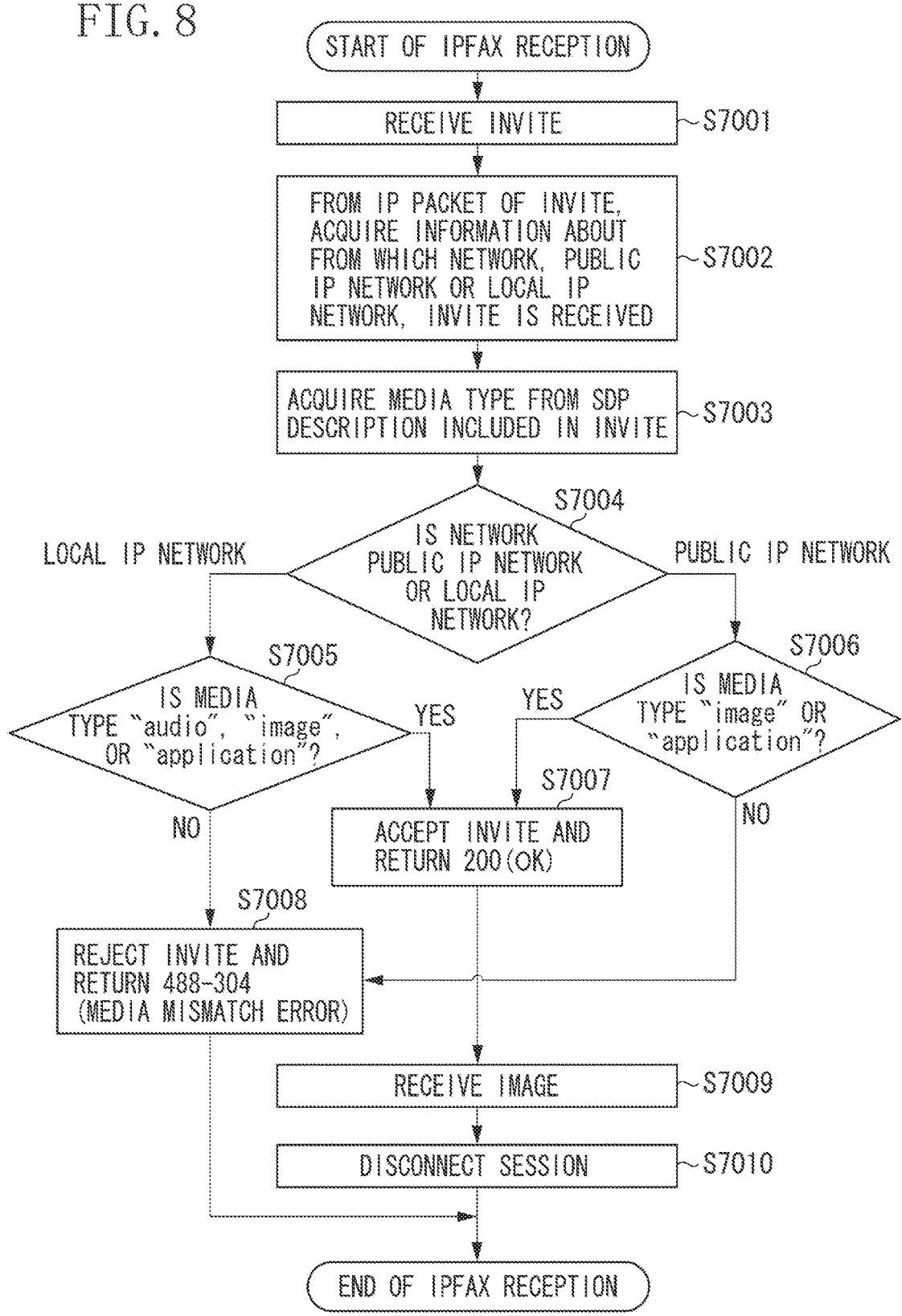
FIG. 8 is a flowchart illustrating an example of information processing performed when the IPFAX 1 receives an incoming call from the IPFAX 2, the IPFAX 3, or the IP phone.

FIG. 8 is a flowchart illustrating an example of information processing performed when the IPFAX 1 (1001) receives an incoming call from the IPFAX 2 (1004), IPFAX 3 (1006), or IP phone 1009. The IPFAX 2 (1004) is connected to the public IP network 1003, the IPFAX 3 (1006) is connected to the local IP network 1000, and the IP phone 1009 is connected to the public IP network 1003.

First, in step S7001, the IPFAX 1 (1001) receives an INVITE message.

In step S7002, the IPFAX 1 (1001) acquires the transmission source IP address from the IP packet of the INVITE message. The IPFAX 1 (1001) compares the acquired transmission source IP address with the IP addresses registered via the screen illustrated in FIG. 4. If the transmission source IP address matches the IP address of the home gateway set in the field 3002, as a result of the comparison, the IPFAX 1 (1001) determines that the INVITE message is transmitted from a device on the public IP network. If the transmission source IP address matches the IP address of the SIP server set in the field 3003, as a result of the comparison, the IPFAX 1 (1001) determines that the INVITE message is transmitted from a device on the local IP network. The IPFAX 1 (1001) determines the transmission source of the INVITE message similarly if the transmission source IP address matches one of the IP addresses of T.38 GWs set in the fields 3004, 3005, and 3006. That is, the IPFAX 1 (1001) determines that the INVITE message is transmitted from an analog FAX connected to the T.38 GW connected to the local IP network. If the acquired transmission source IP address does not match any of the registered IP addresses, it is estimated that the INVITE message is received not via a gateway or an SIP server, but directly from a device connected in the peer-to-peer mode. In this case, the IPFAX 1 (1001) determines that the INVITE massage is transmitted from a device on the local IP network as well.

In step S7003, the IPFAX 1 (1001) acquires a media type from the SDP description included in the INVITE message.

In step S7004, if the transmission source is the local IP network as result of the acquisition in step S7002 ("LOCAL IP NETWORK" in step S7004), the IPFAX 1 (1001) advances the processing to step S7005. If the transmission source is the public IP network ("PUBLIC IP NETWORK" in step S7004), the IPFAX 1 (1001) advances the processing to step S7006.

In step S7005, if the media type acquired in step S7003 is "audio", "image", or "application" (YES in step S7005), the IPFAX 1 (1001) advances the processing to step S7007. If the media type is none of them (for example, the media type is "video") (NO in step S7005), the IPFAX 1 (1001) advances the processing to step S7008.

In step S7006, if the media type acquired in step S7003 is "image" or "application" (YES in step S7006), the IPFAX 1 (1001) advances the processing to step S7007. If the media type is none of them, (for example, the media type is "audio" or "video") (NO in step S7006), the IPFAX 1 (1001) advances the processing to step S7008.

In step S7007, the IPFAX 1 (1001) accepts the incoming call, transmits to the transmission source a response indicating a successful transmission (status code 200), and then advances the processing to step S7009.

In step S7008, the IPFAX 1 (1001) rejects the incoming call, and transmits a media mismatch error (status code 488, warning code 304) to the transmission source.

In step S7009, the IPFAX 1 (1001) receives an IPFAX image. After receiving the image, the IPFAX 1 (1001) advances the processing step S7010.

In step S7010, the IPFAX 1 (1001) disconnects the session.

An exemplary embodiment of the present invention is also implemented by executing the following processing. That is, software (a program) for implementing the function of the exemplary embodiment described above is supplied to a system or an apparatus via a network or various storage media. The computer (or CPU or micro processing unit (MPU)) of the system or the apparatus reads the program and executes the processing.

According to the exemplary embodiments described above, on a public IP network, an INVITE message is rejected if the media type "audio" is specified in the INVITE message received from a phone with which communication cannot be performed. This prevents unnecessary communication fee from being incurred by the caller side. In addition, on a local IP network, an INVITE message in which the media type "audio" is specified is accepted according to a specific procedure, whereby IPFAX communication can be performed.

Therefore, according to the present invention, connection from both a device on a local IP network and a device on a public IP network can be performed, and at the same time, unnecessary charging can be prevented.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A communication method executed by an image processing apparatus which is capable of performing an Internet Protocol facsimile communication via an Internet Protocol network, the information processing method comprising:

receiving an INVITE message in which audio is specified for the media type in an SIP (Session Initiation Protocol) for establishing a session;

determining whether the received INVITE message is transmitted via a SIP server;

establishing a session and performing the Internet Protocol facsimile communication using the established session in a case where it is determined that the received INVITE message is transmitted via the SIP server, wherein the session is not established and the Internet Protocol facsimile communication is not performed in a case where it is determined that the received INVITE message is transmitted not via the SIP server.

2. The communication method according to claim 1, wherein it is determined that the received INVITE message is transmitted not via the SIP server in a case where the received INVITE message is transmitted via a Gateway server.

3. The communication method according to claim 1, wherein in a case where it is determined that the received INVITE message is transmitted via the SIP server, a message for approving the establishment of the session is transmitted, and in a case where it is determined that the received INVITE message is transmitted not via the SIP server, a message for disapproving the establishment of the session is transmitted.

4. The communication method according to claim 3, wherein an INVITE message in which an image or an application is specified for the media type is transmitted after transmitting the message for approving the establishment of the session.

5. The communication method according to claim 1, wherein it is determined whether the received INVITE message is transmitted via the SIP server by referring to an IP packet of the received INVITE message.

6. The communication method according to claim 1, wherein in a case where an INVITE message in which an image or an application is specified for the media type is received, a session is established regardless of a transmission source of the received INVITE message.

7. The communication method according to claim 1, wherein the SIP server requires a procedure including, after establishing a session once by communicating an INVITE message in which audio is specified for the media type, re-establishing the session by communicating an INVITE message in which an image or an application is specified for the media type.

8. The communication method according to claim 1, wherein the Gateway is a T.38 Gateway provided by a predetermined company.

9. The communication method according to claim 1, wherein the Gateway is Home Gateway.

10. The communication method according to claim 8, wherein the T.38 Gateway requires a procedure including, after establishing a session once by transmitting an INVITE message in which audio is specified for the media type, re-establishing the session by communicating an INVITE message in which an image or an application is specified for the media type.

11. An image processing apparatus which is capable of performing an Internet Protocol facsimile communication via an Internet Protocol network, the information processing apparatus comprising:
 a receiver that receives an INVITE message in which audio is specified for the media type in an SIP (Session Initiation Protocol) for establishing a session;
 a controller that determines whether the received INVITE message is transmitted via a SIP server, and
 a controller that establishes a session and performing the Internet Protocol facsimile communication using the established session in a case where it is determined that the received INVITE message is transmitted via the SIP server,
 wherein the session is not established and the Internet Protocol facsimile communication is not performed in a case where it is determined that the received INVITE message is transmitted not via the SIP server.

12. The image processing apparatus according to claim 11, wherein it is determined by the controller that the received INVITE message is transmitted not via the SIP server in a case where the received INVITE message is transmitted via a Gateway server.

13. The image processing apparatus according to claim 11, wherein in a case where it is determined by the controller that the received INVITE message is transmitted via the SIP server, a message for approving the establishment of the session is transmitted, and in a case where it is determined by the controller the received INVITE message is transmitted not via the SIP server, a message for disapproving the establishment of the session is transmitted.

14. The image processing apparatus according to claim 13, wherein an INVITE message in which an image or an application is specified for the media type is transmitted after transmitting the message for approving the establishment of the session.

15. The image processing apparatus according to claim 11, wherein it is determined whether the received INVITE message is transmitted via the SIP server by referring to an IP packet of the received INVITE message.

16. The image processing apparatus according to claim 11, wherein in a case where an INVITE message in which an image or an application is specified for the media type is received, a session is established regardless of a transmission source of the received INVITE message.

17. The image processing apparatus according to claim 11, wherein the Gateway is Home Gateway.

18. The image processing apparatus according to claim 11, wherein the Gateway is a T.38 Gateway provided by a predetermined company.

* * * * *